United States Patent
Halmstad et al.

(10) Patent No.: US 9,647,897 B2
(45) Date of Patent: May 9, 2017

(54) DYNAMIC GROUPING OF MANAGED DEVICES

(71) Applicant: JAMF Software, LLC, Minneapolis, MN (US)

(72) Inventors: Richard Zachary Halmstad, Eau Claire, WI (US); Matthew John Anderson, Eau Claire, WI (US); Bryan Christopher Hengels, Eau Claire, WI (US); Ryan Brent Yohnk, Chippewa Falls, WI (US)

(73) Assignee: JAMF Software, LLC, Minneapolis, MN (US)

( * ) Notice: Subject to any disclaimer, the term of this patent is extended or adjusted under 35 U.S.C. 154(b) by 0 days.

(21) Appl. No.: 14/464,572

(22) Filed: Aug. 20, 2014

(65) Prior Publication Data

US 2016/0057020 A1    Feb. 25, 2016

(51) Int. Cl.
   *G06F 3/048*        (2013.01)
   *H04W 4/08*         (2009.01)
   (Continued)

(52) U.S. Cl.
   CPC ........... *H04L 41/22* (2013.01); *G06F 3/0481* (2013.01); *H04L 41/0893* (2013.01); *H04L 67/26* (2013.01); *H04W 4/08* (2013.01)

(58) Field of Classification Search
   CPC ....... G06F 3/048; H04W 4/08; H04L 41/0893
   (Continued)

(56) References Cited

U.S. PATENT DOCUMENTS 7,831,699 B2   11/2010   Kumar et al.
7,847,789 B2   12/2010   Kolmykov-Zotov et al.
(Continued)

FOREIGN PATENT DOCUMENTS

EP   0399667 B1   11/1996
EP   2667340 A1   11/2013
(Continued)

OTHER PUBLICATIONS

"Configuring Distribution Point Groups in Configuration Manager", Feb. 1, 2012, accessed Aug. 20, 2014, TechNet Blogs, 1 pages.
(Continued)

*Primary Examiner* — Xuyang Xia
(74) *Attorney, Agent, or Firm* — Toler Law Group, PC

(57) ABSTRACT

A particular method includes generating, at a server configured to access inventory data associated with one or more managed devices, a graphical user interface (GUI) that is operable to define grouping criteria for one or more dynamic groups of managed devices. The method also includes receiving, at the server via the GUI, first grouping criteria and data identifying an action to be performed with respect to managed devices that satisfy the first grouping criteria. The first grouping criteria is based on at least second grouping criteria and a logical operator. The method further includes determining, at the server based on the inventory data, a group of managed devices that satisfy the first grouping criteria. The method includes initiating, by the server, transmission of a push notification regarding the action to each managed device in the group of managed devices.

19 Claims, 12 Drawing Sheets

(51) Int. Cl.
  *H04L 12/24* (2006.01)
  *G06F 3/0481* (2013.01)
  *H04L 29/08* (2006.01)

(58) Field of Classification Search
  USPC .................................................. 715/740
  See application file for complete search history.

(56) References Cited

U.S. PATENT DOCUMENTS

| | | | |
|---|---|---|---|
| 8,332,878 B2 | 12/2012 | Harm | |
| 8,370,479 B2* | 2/2013 | Hart .................... | H04L 41/0893 709/224 |
| 8,478,338 B2 | 7/2013 | Sudhakar | |
| 8,588,818 B2 | 11/2013 | Huang et al. | |
| 8,595,336 B1 | 11/2013 | Tsern et al. | |
| 8,640,190 B1 | 1/2014 | Banerjee | |
| 8,671,187 B1 | 3/2014 | Fu et al. | |
| 2002/0023132 A1* | 2/2002 | Tornabene et al. ........... | 709/205 |
| 2002/0065914 A1 | 5/2002 | Goodwin, III et al. | |
| 2003/0035380 A1* | 2/2003 | Downing et al. ........... | 370/255 |
| 2003/0126137 A1* | 7/2003 | McFadden ................... | 707/100 |
| 2003/0174168 A1* | 9/2003 | van Leersum ........ | G06F 9/4443 715/764 |
| 2004/0147258 A1 | 7/2004 | Dokko | |
| 2005/0234931 A1* | 10/2005 | Yip .................... | H04L 41/0816 |
| 2005/0262076 A1 | 11/2005 | Voskuil | |
| 2006/0099965 A1 | 5/2006 | Aaron | |
| 2007/0192720 A1* | 8/2007 | Alsup et al. .................. | 715/769 |
| 2008/0051076 A1 | 2/2008 | O'Shaughnessy et al. | |
| 2008/0070495 A1* | 3/2008 | Stricklen et al. ........... | 455/3.01 |
| 2008/0096178 A1 | 4/2008 | Rogers et al. | |
| 2008/0109754 A1* | 5/2008 | Weinberg et al. ............ | 715/803 |
| 2008/0288868 A1* | 11/2008 | Lakey ................... | G06F 3/0483 715/716 |
| 2009/0122775 A1 | 5/2009 | Haartsen | |
| 2009/0148824 A1 | 6/2009 | Argott | |
| 2009/0177512 A1* | 7/2009 | Dogan ................... | G06Q 10/06 726/1 |
| 2009/0263777 A1 | 10/2009 | Kohn | |
| 2010/0267359 A1* | 10/2010 | Gyllensvaan .............. | 455/404.1 |
| 2011/0078411 A1* | 3/2011 | Maclinovsky ......... | G06Q 10/06 712/30 |
| 2011/0173681 A1 | 7/2011 | Qureshi et al. | |
| 2011/0274286 A2 | 11/2011 | McCarty et al. | |
| 2012/0023557 A1 | 1/2012 | Bevan et al. | |
| 2012/0072844 A1* | 3/2012 | Lefrancois des Courtis et al. ............................. | 715/736 |
| 2012/0184210 A1 | 7/2012 | Wu et al. | |
| 2012/0284325 A1 | 11/2012 | Erb | |
| 2013/0029731 A1 | 1/2013 | Fuchigami et al. | |
| 2013/0073326 A1 | 3/2013 | Jordan et al. | |
| 2013/0080955 A1* | 3/2013 | Reimann ............... | G06F 3/0486 715/769 |
| 2013/0089849 A1 | 4/2013 | Huang | |
| 2013/0122481 A1 | 5/2013 | Rovner | |
| 2013/0212278 A1 | 8/2013 | Marshall et al. | |
| 2013/0254889 A1 | 9/2013 | Stuntebeck | |
| 2013/0281077 A1 | 10/2013 | Zou et al. | |
| 2013/0281084 A1 | 10/2013 | Batada et al. | |
| 2013/0290426 A1 | 10/2013 | Sorensen | |
| 2013/0297844 A1 | 11/2013 | Rosenberg et al. | |
| 2013/0304641 A1 | 11/2013 | Dabbiere | |
| 2013/0311684 A1 | 11/2013 | Dabbiere | |
| 2014/0018048 A1 | 1/2014 | Anand et al. | |
| 2014/0026062 A1 | 1/2014 | Proudfoot et al. | |
| 2014/0032635 A1 | 1/2014 | Pimmel et al. | |
| 2014/0064116 A1 | 3/2014 | Linde et al. | |
| 2014/0068778 A1 | 3/2014 | Bhatia et al. | |
| 2014/0245008 A1 | 8/2014 | Dabbiere et al. | |
| 2014/0272896 A1 | 9/2014 | Malik et al. | |
| 2014/0280934 A1 | 9/2014 | Reagan et al. | |
| 2014/0280944 A1 | 9/2014 | Montgomery et al. | |
| 2014/0282869 A1 | 9/2014 | Dabbiere | |
| 2014/0282894 A1 | 9/2014 | Manton | |
| 2014/0282929 A1 | 9/2014 | Tse | |
| 2014/0310772 A1 | 10/2014 | Marshall et al. | |
| 2014/0324649 A1 | 10/2014 | Marshall et al. | |
| 2014/0325204 A1 | 10/2014 | Dabbiere | |
| 2014/0330944 A1 | 11/2014 | Dabbiere et al. | |
| 2014/0330945 A1 | 11/2014 | Dabbiere et al. | |
| 2015/0055686 A1 | 2/2015 | Hryciuk et al. | |
| 2015/0304484 A1 | 10/2015 | Halmstad et al. | |
| 2016/0037333 A1 | 2/2016 | Amundsen et al. | |

FOREIGN PATENT DOCUMENTS

| | | |
|---|---|---|
| WO | 02099770 A1 | 12/2002 |
| WO | 2009016612 A2 | 2/2009 |
| WO | 2013002920 A1 | 1/2013 |

OTHER PUBLICATIONS

John, V., "Configuration Manager 2012: Content Management," Apr. 2011, accessed Aug. 20, 2014, TechNet Blogs, 3 pages.

Griswold, M., "The best group is a DP group!", Michael Griswold's SCCM Tips and Tricks, Mar. 8, 2014, accessed Aug. 20, 2014, TechNet Blogs, 1 page.

"Classroom Control Systems," <<http://wikis.ala.org/acrl/index.php/Classroom_Control_Systems>>, retrieved on Apr. 2, 2015, Association of College and Research Libraries, Chicago, IL, pp. 1-7.

"Download iBeacons Bible 1.0", retrieved from <<https://meetingofideas.files.wordpress.com/2013/12/12/download-ibeacons-bible-1-0/>>, Dec. 12, 2013, Gaia-Matrix, 4 pages.

"Get Ready for iOS iBeacon," http://www.endpointprotector.com/solutions/iBeacon_for_mobile_device_management_mdm>>, retrieved on Sep. 11, 2014, CoSoSys, Cluj-Napoca, Romania, pp. 1-3.

"How to Lock an App on iPad, iPod, or iPhone," <<http://luv2teachgirl.blogspot.com/2012/10/how-to-lock-app-on-ipad-ipod-or-iphone.html>>, retrieved on Apr. 2, 2015, pp. 1-4.

"Manage Devices and Content in the Classroom," <<https://www.apple.com/education/it/>>, retrieved on Apr. 2, 2015, Apple, Inc., Cupertino, CA, pp. 1-4.

"SMART Sync classroom management software," <<http://smarttech.com/Solutions/Education+Solutions/Products+for+education/Software/SMART+Sync>>, retrieved on Mar. 26, 2014, Smart Tech, Calgary Alberta, pp. 1-3.

"Teacher's Assistant for the iPad," <<http://www.lanschool.com/ipad>>, Apr. 2, 2015, Stoneware, Indianapolis, Indiana, pp. 1-3.

"Vision6 Classroom Management Software," <<www.act4networks.com/Documents/Vision6_Brochure.pdf>>, retreived on Apr. 2, 2015, ACT Network Solutions, 4 pages.

Cavallini, A., "iBeacons Bible 1.0", retrieved from <<https://meetingofideas.files.wordpress.com/2013/12/ibeacons-bible-1-0.pdf>>, Dec. 12, 2013, Gaia-Matrix, pp. 1-14.

International Search Report and Written Opinion for International Application No. PCT/NL/2014620, ISA/US, Date of Mailing Sep. 14, 2015, 16 pages.

Invitation to Pay Additional Fees and, Where Applicable, Protest Fee for International Application No. PCT/US15/25361, ISA/US, Date of Mailing Jul. 6, 2015, 2 pages.

Kahn, J., "BeHere App uses iBeacons to Automatically take Attendence as Students Enter the Classroom," <<http://9to5mac.com/2014/03/28/behere-app-uses-ibeacons-to-automatically-take-attendance-as-students-enter-the-classroom/>>, retrieved on Apr. 1, 2015,, pp. 1-3.

Netherlands Search Report, Netherlands Application No. 2014620, Date of Mailing Dec. 2, 2015, 15 pages.

Perez, S., "BeHere Lets Teachers Take Attendance Using iBeacon Technology," <<http://techcrunch.com/2014/03/28/behere-lets-teachers-take-attendance-using-ibeacon/>>, retrieved on Apr. 2, 2015, Techcrunch.com, pp. 1-3.

\* cited by examiner

FIG. 5

Define Grouping Criteria for "Outdated Mobile Devices" Group

| Computers | Mobile Devices | Users |

Outdated Mobile Devices

| Mobile Device Group | *Criteria* |

Search Inventory

Configuration Profiles
Provisioning Profiles
Apps
eBooks

Smart Mobile Device Groups
Static Mobile Device Groups
Classes

Enrollment Profiles
Enrollment Invitations

Management Settings

[+] Add — 602

| And/Or | Criteria | Operator | Value | | |
|---|---|---|---|---|---|
| | Model — 604, 606 | is — 608 | 2014 Phone — 610 | | Delete |
| and — 612 | Display Name | is | Test Phone — 614 | | Delete |
| or — 616 | Model | is | 2013 Phone | | Delete |

Cancel  Save — 618

*FIG. 6*

Create New "Outdated Mobile Device with Low Battery" Group Based on
Previously Created "Outdated Mobile Devices" Group and Logical Operator(s)

900

Outdated Mobile Devices with Low Battery

| | Mobile Device Group | *Criteria* |
|---|---|---|

[+ Add]

| And/Or | Criteria | Operator | Value | | |
|---|---|---|---|---|---|
| ( ▽ | Mobile Device Group ▽ | member of ▽ | Outdated Mobile D ⊙ ) ▽ | | Delete |
| and ▽ | Battery Level ▽ | is less than ▽ | 10% ⊙ ) ▽ | | Delete |

902

[Cancel] [Save]

Search Inventory

Configuration Profiles
Provisioning Profiles
Apps
eBooks

*Smart Mobile Device Groups*
Static Mobile Device Groups
Classes

Enrollment Profiles
Enrollment Invitations

Management Settings

Computers | Mobile Devices | Users

*FIG. 9*

DYNAMIC GROUPING OF MANAGED DEVICES

BACKGROUND

Mobile devices are becoming increasingly prevalent in everyday use, including in home, office, and educational environments. For example, school districts are starting to implement one-to-one technology programs that provide each student access to a mobile device, such as a tablet computer. As another example, many corporations provide employees with mobile devices to perform job-related functions on-the-go. To maintain control of the devices, a school or corporation may rely on information technology (IT) administrators that maintain a roster of devices and statuses of each device. However, relying on IT administrators for all mobile device management (MDM) may be inefficient and expensive. For example, at a large corporation with thousands of employees it may take weeks for IT administrators to recall each device, install a software application on each of the devices, and return the devices to the employees. Moreover, it may be difficult for the IT administrators to quickly determine which devices have a particular application installed and which devices need updating.

SUMMARY

The present disclosure provides systems and methods that enable a mobile device management (MDM) server to maintain and update inventory information based on "smart" groups. As used herein, a "smart" group may be a group whose membership is dynamically updated in response to certain events. To illustrate, an IT administrator may create a group that has particular membership/grouping criteria. The membership of the group may be dynamically updated as managed devices (e.g., mobile phones, tablet computers, laptop computers, etc.) check-in with the MDM server and provide updated inventory information. An IT administrator may use the dynamically updated group to more easily and quickly perform MDM actions. As an illustrative non-limiting example, a dynamically updated group may be created for devices that have not backed up data to the MDM server (or another external backup device) in the last 30 days. To send a reminder message regarding backup to all devices that have not backed up in the last 30 days, an IT administrator may select the group as a recipient of the message, which may be faster and easier than the IT administrator identifying each individual device that has not backed up in the past 30 days. For example, using dynamic groups of managed devices to select targets of MDM actions may be faster than the IT administrator querying a device database or requesting individual device users to indicate when their respective devices were backed up.

It should be noted that although various embodiments may be described herein with reference to educational or corporate settings, this is an example only and not to be considered limiting. The teachings of the present disclosure may be applied to other mobile device environments, including but not limited to home environments, retail environments, etc.

BRIEF DESCRIPTION OF THE DRAWINGS

FIG. 5 illustrates another particular embodiment of a dynamic grouping GUI;

FIG. 6 illustrates another particular embodiment of a dynamic grouping GUI;

FIG. 9 illustrates another particular embodiment of a dynamic grouping GUI;

DETAILED DESCRIPTION

Figure 1:
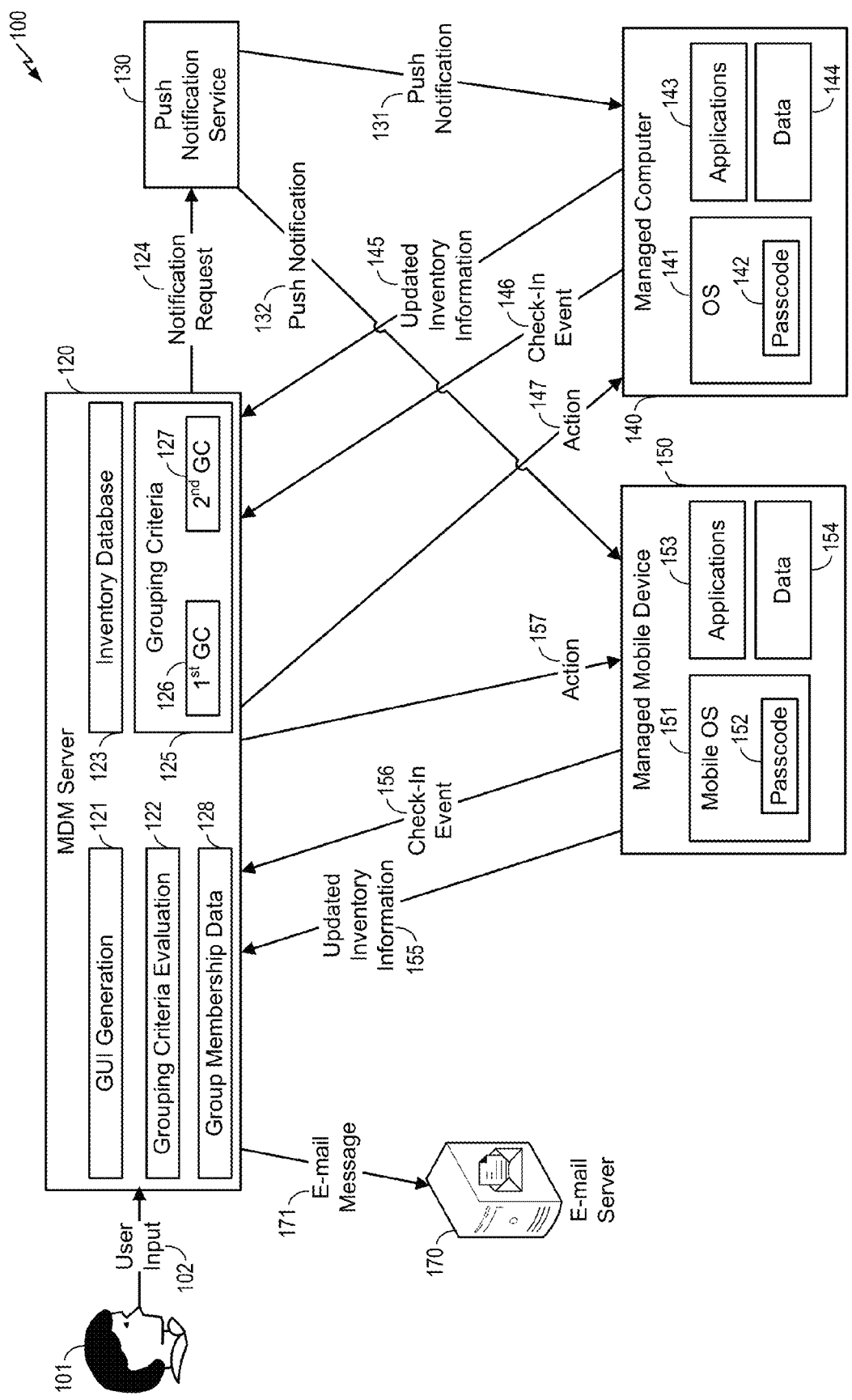
FIG. 1 is a diagram that illustrates a particular embodiment of a system that is operable to maintain dynamically updated groups of managed devices.

Referring to FIG. 1, a particular embodiment of a system that is operable to maintain dynamically updated groups of devices is shown and generally designated 100. The system includes a mobile device management (MDM) server 120 that is communicably coupled to a push notification service 130, one or more managed computers (e.g., an illustrative managed computer 140), one or more managed mobile devices (e.g., an illustrative managed mobile device 150), and an e-mail server 170. It should be noted that although one managed computer 140 and one managed mobile device 150 is shown in FIG. 1, the present disclosure is not limited to any particular configuration or number of devices. In alternate embodiments, a different number of managed computers and/or managed mobile devices may be present. For example, more than one managed computer and more than one managed mobile device may be registered with the MDM server 120.

The managed computer 140 may be a portable computing device with wired and/or wireless networking capability. For example, the managed computer 140 may be a desktop computer, a laptop computer, a server, etc. The managed mobile device 150 may be a portable device with wireless networking capability. For example, the managed mobile device 150 may be a tablet computer, a mobile phone, a portable media player, an electronic book (eBook) reader, or any combination thereof.

The managed computer 140 may include an operating system (OS) 141 and the managed mobile device 150 may include a mobile OS 151. Each OS 141, 151 may control computing functions, such as input/output (e.g., a touchscreen display, speaker, microphone, camera, etc.) and networking (e.g., cellular, Bluetooth, Wi-Fi, Ethernet, etc.). Each OS 141, 151 may also support execution of applications (apps) 143, 153 and provide such applications access to device resources and data 144, 154. Examples of applications include, but are not limited to, a web browser, e-mail, a calendar, social networking, a document/eBook reader, a media player, etc. Applications may correspond to software instructions that are stored in a memory and executed by a processor, hardware circuits that implement application functionality, or both. The applications 143, 153 may be pre-installed (e.g., as part of or along with an OS) or may be installed after being downloaded (e.g., via a storefront) or sideloaded (e.g., from an external storage device). In a particular embodiment, each OS 141, 151 stores a passcode 142, 152. For example, the passcodes 142, 152 may be used to secure device access. When a user attempts to operate a device, the user may be prompted to input a passcode, and access to the device may not be enabled unless the input passcode matches the stored passcode 142, 152.

The MDM server 120 may correspond to hardware and/or software that implements MDM functions. As an illustrative non-limiting example, in an educational context, the MDM server 120 may manage teacher and student computers and mobile devices. The MDM server 120 may include a graphical user interface (GUI) generation module 121. The GUI generation module 121 may generate a GUI that is operable to (e.g., that can be used to) define dynamic groups. For example, the MDM server 120 may send the generated GUI to a computing device associated with a user 101 (e.g., an IT administrator) and may receive user input 102 via the GUI. The user input 102 may define grouping criteria for one or more dynamic groups, as further described herein. The MDM server 120 may store grouping criteria 125 received via the GUI. Examples of the GUI generated by the GUI generation module 121 are further described with reference to FIGS. 4-11.

The MDM server 120 may include a grouping criteria evaluation module 122 and may store (or have access to) an inventory database 123 and group membership data 128, as shown. The inventory database 123 may include data regarding each managed entity (e.g., a computer or a mobile device) in the system 100. An example of the data stored in the inventory database 123 is further described with reference to FIG. 2. In a particular embodiment, the inventory database 123 includes values of various inventory attributes for each managed entity. As an illustrative non-limiting example, inventory data for a managed computer may include values for one or more of the following inventory attributes:

Active Directory Status, Application Title, Application Version, Architecture Type, Asset Tag, Available RAM Slots, Available SWUs, Bar Code, Battery Capacity, Boot Drive Percentage Full, Boot ROM, Building, Bus Speed MHz, Cached Packages, Computer Group, Computer Name, Department, Disk Encryption Configuration, Drive Capacity MB, Customer Care ID, Encrypted Volumes Eligibility, Encrypted Volumes Individual Key Validation, Encrypted Volumes Institutional Key, Encrypted Volumes Partition Encryption State, Encrypted Volumes Recovery Key Type, Encrypted Volumes Status, Encrypted Volumes User, Email Address, Enrollment Method: PreStage enrollment, Font Title, Font Version, Full Name, IP Address, Last Check-in, Last Enrollment, Last Inventory Update, Lease Expiration, Licensed Software, Life Expectancy, Local User Accounts, MAC Address, Make, Mapped Printers, Master Password Set, MDM Platform Binary Version, MDM Server ID, Model, Model Identifier, NIC Speed, Number of Available Updates, Number of Processors, Operating System, Optical Drive, Packages Installed By MDM Suite, Packages Installed By Native Installer/SWU, Partition Name, Phone Number, Platform, Plug-in Title, Plug-in Version, PO Date, PO Number, Position, Processor Speed MHz, Processor Type, Purchase Price, Purchased or Leased, Purchasing Account, Purchasing Contact, Room, Running Services, S.M.A.R.T. Status, Scheduled Tasks, Serial Number, Service Pack, SMC Version, Total RAM MB, Username, Vendor, Warranty Expiration As another illustrative non-limiting example, inventory data for a managed mobile device may include values for one or more of the following inventory attributes:

Activation Lock Bypass Enabled, App Identifier, App Name, App Version, Asset Tag, Available Space MB, Battery Level, Block Encryption Capability, Bluetooth MAC Address, Building, Capacity MB, Carrier Settings Version, Cellular Technology, Certificate Name, Current Carrier Network, Current Mobile Country Code, Current Mobile Network Code, Customer Care ID, Data Protection, Data Roaming Enabled, Department, Device ID, Device Locator Service Enabled, Device Phone Number, Display Name, Do Not Disturb Enabled, Email Address, Enrollment Method: Enrollment profile, Enrollment Method: PreStage enrollment, Enrollment Method: User-initiated—invitation, Enrollment Method: User-initiated—no invitation, Expires, File Encryption Capability, Full Name, Hardware Encryption, Home Carrier Network, Home Mobile Country Code, Home Mobile Network Code, ICCID, Identifier, Identity, IMEI, IP Address, Languages, Last Backup, Last Enrollment, Last Inventory Update, Lease Expiration, Life Expectancy, Locales, MDM Profile Removal Allowed, MEID, Mobile Device Group, Model, Model Identifier, Modem Firmware Version, OS Build, OS Version, Passcode Compliance, Passcode Compliance with Profile(s), Passcode Status, PO Date, PO Number, Position, Profile Name, Provisioning Profile Name, Purchase Price, Purchased or Leased, Purchasing Account, Purchasing Contact, Roaming, Room, Serial Number, Subscriber MCC, Subscriber MNC, Supervised, UDID, Used Space Percentage, User Phone Number, Username, Vendor, Version, Voice Roaming Enabled, Warranty Expiration, Wi-Fi MAC Address, Wireless Media Streaming Password The group membership data 128 may include a list of devices that are members of each dynamic group maintained by the MDM server 120. The group membership data 128 may be updated in response to various events that occur in the system 100. As illustrative non-limiting examples, the group membership data 128 may be updated responsive to a managed device being added to the system 100, a managed device being removed from the system 100, a managed device providing updating inventory data to the MDM server 120, etc. An example of updating the group membership data 128 is further described with reference to FIG. 3. In a particular embodiment, the MDM server 120 transmits an alert in response to a change in membership of a group. For example, the MDM server 120 may send an e-mail message 171 to the user 101 or to another IT administrator via the e-mail server 170. Additional examples of alerts may include, but are not limited to, short message service (SMS) messages, instant messages, GUI alerts, automated telephone calls, etc.

In a particular embodiment, the user input 102 may include data identifying an action to be performed with respect to managed entities (e.g., managed devices) of a particular dynamic group. For example, a "Low Battery Laptops" dynamic group may include laptops that have battery levels less than a threshold ("Battery Level<10%"), and the action may be displaying a pop-up message on the laptops to remind users to charge the laptops.

Examples of MDM actions may include, but are not limited to, installing an application at a managed device, adjusting a configuration setting at a managed device, providing content to a managed device, sending a message to a managed device, setting or clearing a passcode, editing one or more inventory data attributes, sending a communication/message (e.g., an e-mail or a SMS message), deleting data, sending remote commands, etc.

In response to receiving the user input 102, the grouping criteria evaluation module 122 may determine, based on the membership data 128 and/or the inventory database 123, which laptops are members of the "Low Battery Laptops" group and may initiate transmission of a push notification to such laptops. As further described herein, the MDM server 120 may have previously received and stored information regarding the battery level of the laptops, based on inventory data updates provided by the laptops. Alternatively, or in addition, the MDM server 120 may request battery level information responsive to receiving the user input 102. In a particular embodiment, the MDM server 120 may send a notification request 124 to a push notification service 130, where the notification request 124 identifies the laptops.

In an illustrative embodiment, the GUI enables the user 101 to define dynamic groups via recursive application of grouping criteria. For example, the user input 102 may define a first dynamic group based on first grouping criteria 126 and a second dynamic group based on second grouping criteria 127. The first grouping criteria 126 may be based on at least the second grouping criteria 127 and a logical operator.

To illustrate, the second dynamic group may be called "Science Department Mobile Devices" and may include mobile devices that are the property of (or assigned to) a science department at a school. Accordingly, the second grouping criteria 127 may include a value "Science" of an inventory attribute "Department," e.g., the second grouping criteria 127 may be "Department=Science." The first dynamic group may be called "Chemistry Building Mobile Devices" and may include science department mobile devices that are located in the chemistry building of the school. Accordingly, the first grouping criteria 126 may be: "Mobile Device Group=Science Department Devices AND Building=Chemistry"

Thus, the first dynamic grouping criteria 126 (e.g., chemistry building mobile devices) may be based on at least the second dynamic grouping criteria 127 (e.g., science department mobile devices) and a logical operator (e.g., an AND operator). Examples of logical operators that can be used in grouping criteria include, but are not limited to: and, or, not, is, is not, has, does not have, member of, not member of, organizational operators (e.g., open parenthesis, close parenthesis, etc.), and mathematical operators (e.g., equal to, not equal to, greater than, less than, etc.).

It should be noted that although various embodiments are described herein with reference to educational settings, this is for example only and not to be considered limiting. The teachings of the present disclosure may be applied to other environments, including but not limited to home environments, corporate environments, retail environments, etc.

During operation, the MDM server 120 may receive the user input 102, where the user input 102 includes dynamic grouping criteria and/or identifies action(s) to be performed with respect to the devices of a particular dynamic group. In an illustrative embodiment, the user 101 may be prompted for authentication credentials (e.g., a username, a password, a uniform resource locator (URL) of the MDM server 120, etc.) prior to being granted access to the GUI. Communication between the various components of the system 100 may occur via secure (e.g., encrypted) channels, such as encrypted internet protocol (IP) connections.

When the user input 102 indicates that an action is to be performed with respect to devices of a group, the grouping criteria evaluation module 122 may determine which devices are members of the group. The MDM server 120 may send a notification request 124 to the push notification service 130, where the push notification request 124 identifies the devices that are determined to be members of the group. The push notification service 130 may correspond to one or more network accessible servers that are configured to send push notifications 131, 132 to devices of the group, such as the managed computer 140 and/or the managed mobile device 150.

In a particular embodiment, the push notifications 131, 132 may be associated with check-in events 146 and 156 that cause the managed computer 140 and the managed mobile device 150 to check with the MDM server 120 to see if there are any actions to be performed by the managed computer 140 or the managed mobile device 150. For example, actions 147, 157 specified by the user input 102 may be "queued" by the MDM server 120 and may be retrieved by the managed computer 140 and the managed mobile device 150 in response to the push notifications 131, 132.

In an alternate embodiment, the push notifications 131, 132 may include or identify the action to be performed. For example, the push notifications 131, 132 may utilize an application programming interface (API) of the OS 141 or 151 to instruct the managed computer 140 or the managed mobile device 150 to perform the action. In yet another alternate embodiment, a notification and/or an action may be pushed by the MDM server 120 directly to the managed computer 140 or to the managed mobile device 150. For example, when the managed mobile device 150 is an iOS® device, the command may be compatible with an iOS® MDM API/protocol, such as a device lock command, a clear passcode command, etc. (iOS is a registered trademark of Cisco Systems, Inc. of San Jose, Calif. and is used by Apple Inc. of Cupertino, Calif. under license).

During operation, the managed computer 140 and the managed mobile device 150 may provide updated inventory information 145, 155 to the MDM server 120. The updated inventory information 145, 155 may indicate change(s) in inventory attribute(s) associated with the managed computer 140 and the managed mobile device 150. A managed device may provide updated inventory information to the MDM server 120 in response to a particular event (e.g., performance of a MDM action, relocation into a different building, power-on, wake from sleep mode, etc.). Alternatively, or in addition, updated inventory information may be provided periodically or in response to user input or in response to a request from the MDM server 120. In a particular embodiment, to reduce an amount of data transmitted to the MDM server 120, the updated inventory information only identifies changed values of inventory attributes, instead of values of all inventory attributes. In response to receiving the updated inventory information 145 or 155, the MDM server may update a record in the inventory database 123 for the corresponding managed computer 140 or managed mobile device 150. When the updated inventory information 145, 155 results in addition of the managed computer 140 or the managed mobile device 150 to a dynamic group, or removal from a dynamic group, the MDM server 120 updates the group membership data 128. To illustrate, the MDM server 120 may receive an update from a device, where the update indicates that the device has moved to the chemistry building at the school. The MDM server 120 may update a record in the inventory database 123 for the device to reflect that the device has moved to the chemistry building. The MDM server 120 may also update the group membership data 128 (which may include group membership lists) by adding the device to group(s) whose grouping criteria 125 include "Building=Chemistry" and removing the device from group(s) whose grouping criteria 125 include a different value for "Building."

The system 100 of FIG. 1 may thus support creation and updating of dynamic groups and transmission of push notifications to devices that are in a particular dynamic group. Using dynamic (e.g., "smart") groups to perform MDM actions is typically faster than a user selecting devices one-at-a-time. It will also be appreciated that the system 100 may update group membership automatically based on inventory updates from managed devices and may evaluate group membership just-in-time (e.g., in response to a MDM action request), so that appropriate managed devices are targeted for the MDM action (as opposed to targeting devices based on "stale" inventory information).

Figure 2:
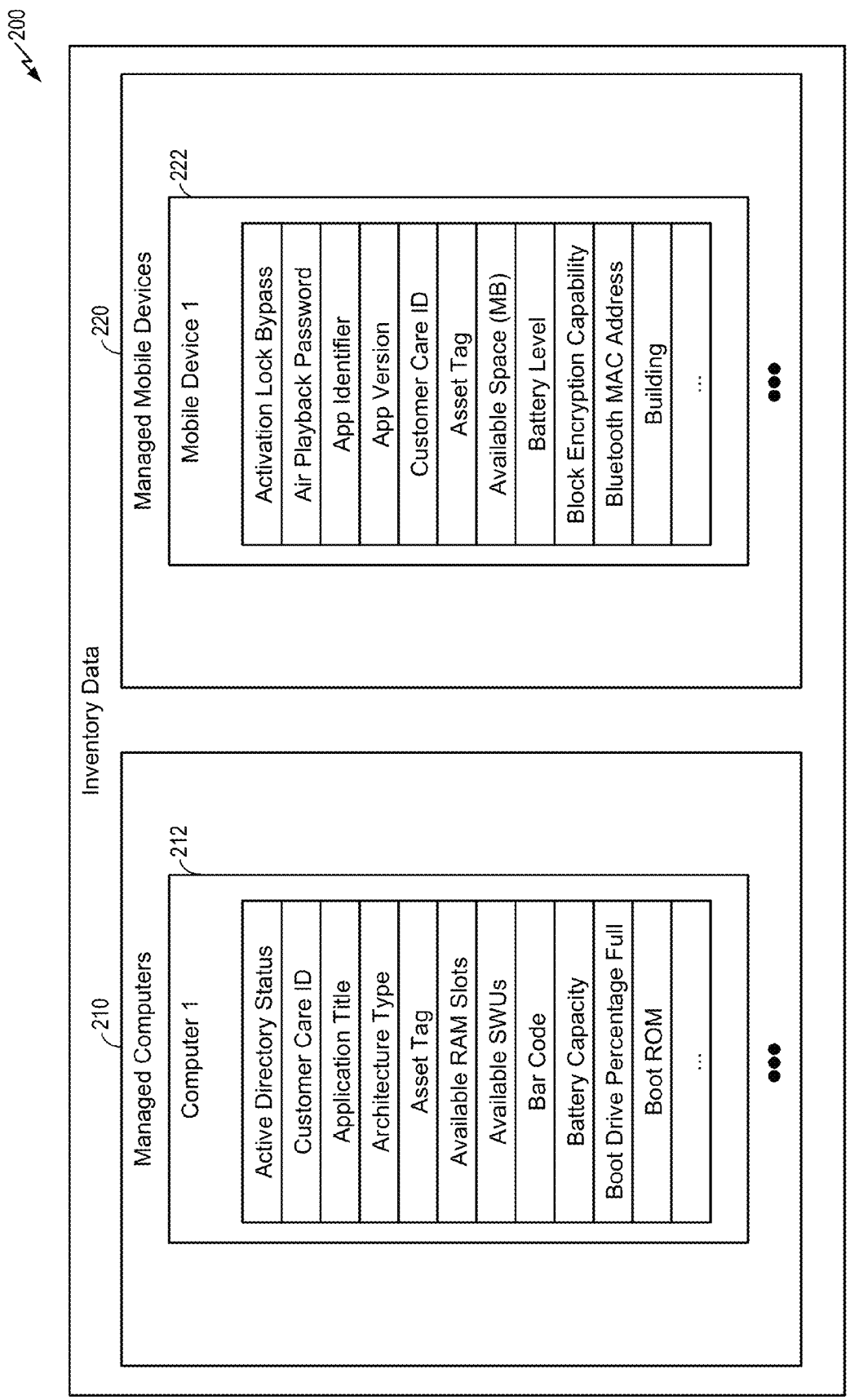
FIG. 2 is a diagram that illustrates inventory data of the system of FIG. 1.

Referring to FIG. 2, a particular embodiment of inventory data is shown and generally designated 200. In an illustrative embodiment, the inventory data 200 may be stored in an inventory database, such as the inventory database 123 of FIG. 1.

The inventory data 200 may include managed computer inventory data 210 and managed mobile device inventory data 220. The managed computer inventory data 210 may include inventory data associated with one or more managed computers that are registered with a MDM server (e.g., the MDM server 120 of FIG. 1). In the illustrated example, the managed computer inventory data 210 includes data 212 associated with a first managed computer (Computer 1). The data 212 associated with the first managed computer may include values of one or more inventory attributes, which may include but are not limited to active directory status, customer care ID, application title, bar code, battery capacity, etc. Additional inventory attributes associated with managed computers are described with reference to FIG. 1.

The managed mobile device inventory data 220 may include inventory data associated with one or more managed mobile devices that are registered with a MDM server (e.g., the MDM server 120 of FIG. 1). In the illustrated example, the managed mobile device inventory data 220 includes data 222 associated with a first managed mobile device (Mobile Device 1). The data 222 associated with the first managed mobile device may include values of one or more inventory attributes, which may include, but are not limited to, activation lock bypass, air playback password, customer care ID, asset tag, battery level, etc. Additional inventory attributes associated with managed mobile devices are described with reference to FIG. 1.

Figure 3:
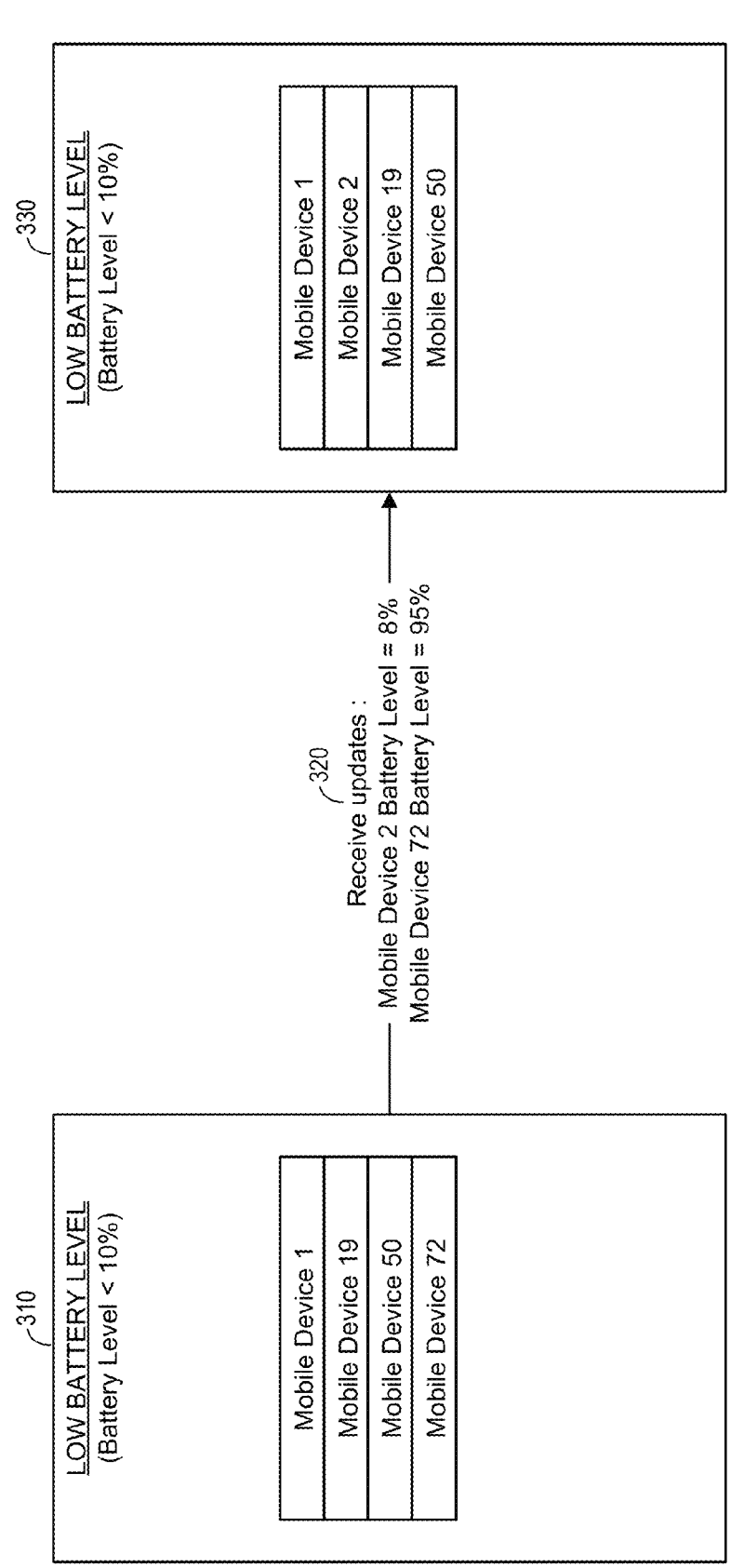
FIG. 3 illustrates a particular embodiment of a method of dynamically updating group membership.

Referring to FIG. 3, an illustrative embodiment of dynamically updating group membership is shown and generally designated 300. In the example of FIG. 3, group membership for a "Low Battery Level" group is shown. The grouping criteria for the group is "Battery Level<10%." Thus, mobile devices with battery levels below 10% will be members of the group.

In the example of FIG. 3, mobile device 1, mobile device 19, mobile device 50, and mobile device 72 are initially members of the low battery level group, as shown at 310. Thus, the group membership data 128 of FIG. 1 for the low battery level group may identify mobile device 1, mobile device 19, mobile device 50, and mobile device 72. Inventory data in the inventory database 123 of FIG. 1 may store a most recently known (e.g., received) battery level for the mobile devices.

A MDM server (e.g., the MDM server 120 of FIG. 1) may receive updates from mobile devices during operation. For example, as shown at 320, the MDM server may receive a first update that a battery level of mobile device 2 is 8% and a second update that a battery level of mobile device 72 is 95%.

In response to receiving the updates, the MDM server may store the received battery level information in the inventory database. The MDM server may also dynamically update group membership data for one or more groups that include battery level as a grouping criterion. For example, as shown at 330, mobile device 2 is added to the low battery level group and mobile device 72 is removed from the low battery level group. In a particular embodiment, instead of modifying group membership data in response to each update from each managed device (e.g., in real-time or near-real-time), the MDM server may queue updates and may process updates asynchronously (e.g., when the MDM server has available resources to process the queued updates). In such an embodiment, if a MDM action is requested by a user, the update queue may be processed (e.g., "emptied") before group membership data is evaluated to identify devices to be notified regarding the MDM action.

It should be noted that the examples shown in FIG. 3 are for illustration only and not to be considered limiting. At any given time, a managed device may be a member of any number of dynamic groups. A device may be removed from a group, added to a group, or both removed from one group and added to another group in response to an update. For example, in response to the update that the battery level of the mobile device 72 is 95%, the mobile device 72 may be removed from the low battery level group and added to a "high battery level" group having grouping criteria "Battery Level>90%." Thus, as illustrated in FIG. 3, a MDM server may dynamically update group membership data based on updated information received from managed devices. It should be noted that although FIG. 3 illustrates updating group membership data based on a change in a single attribute, device updates may include updated values for multiple attributes and group membership data may be updated in response to changes in multiple attributes.

In a particular embodiment, a MDM server (e.g., the MDM server 120) may maintain static groups as well as dynamic groups. Static groups may have fixed membership that is not dynamically updated. For example, a static group having the grouping criteria "Manufacturer=Company X" may have a fixed membership including managed devices manufactured by company X.

Although various embodiments have been described herein with reference to managed computers and managed mobile devices, dynamic groups of other types of managed entities may also be crated and used. For example, the MDM server 120 may support creating and using dynamic groups of users. Each user may be associated with one or more managed devices (e.g., computers or mobile devices), and sending a push notification to a user may result in sending a push notification to one or more managed devices associated with a user. Grouping criteria for dynamic user groups may include values for inventory attributes, such as one or more of the following:

Content Name, Content Type, Email Address, Full Name, Phone Number, Position, Username, Volume Purchase Program (VPP) Account, VPP Invitation Status FIGS. 4-11 illustrate particular embodiments of a graphical user interface (GUI) that may be generated by the GUI generation module 121 of FIG. 1. The MDM server 120 may provide the GUI to a display device for display. For example, the GUI may be displayed at a display device visible to the user 101. The user 101 may use an input device, such as a keyboard, a mouse, a touchscreen, etc. to provide the user input 102 responsive to the GUI.

Figure 4:
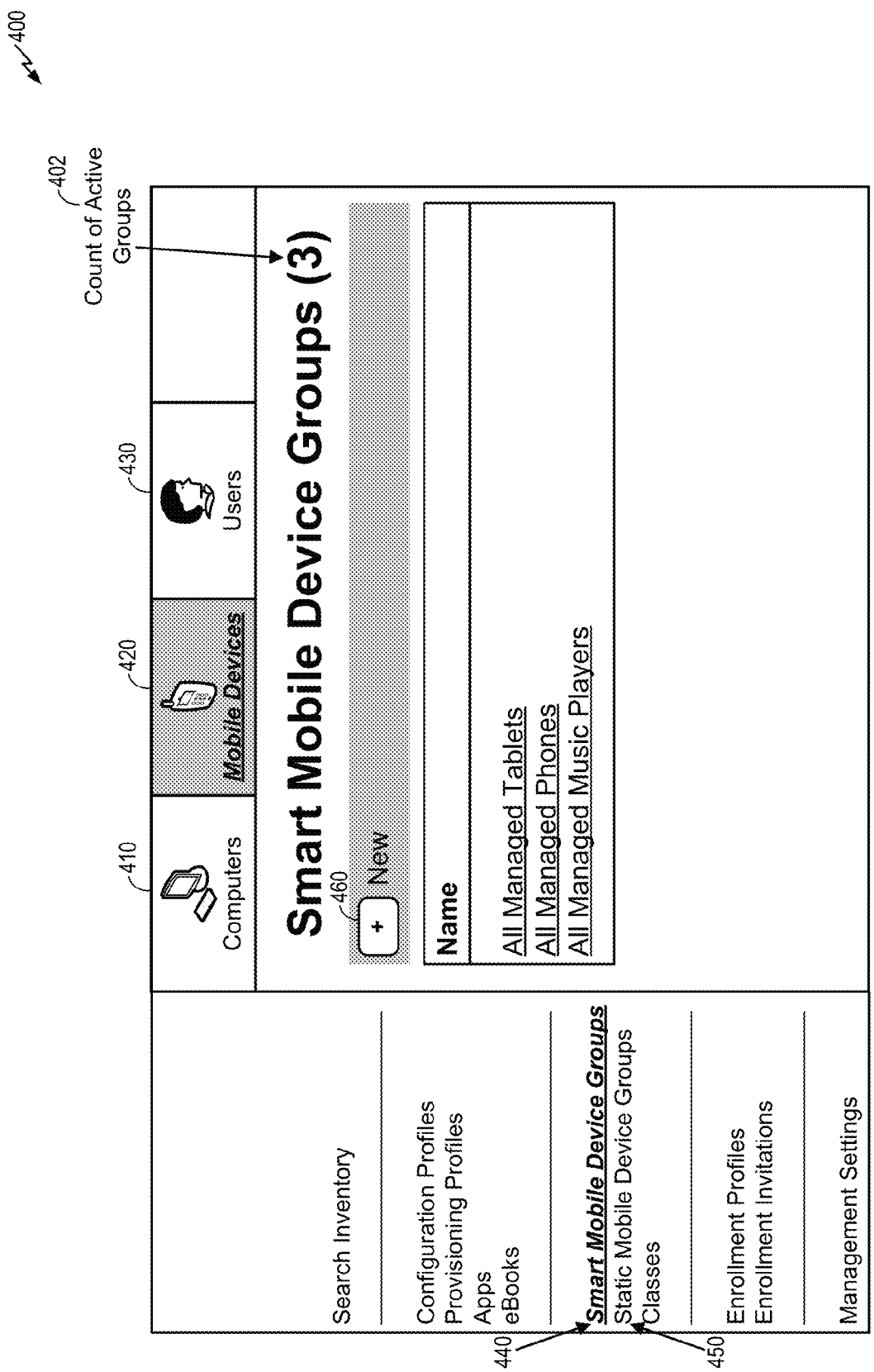
FIG. 4 illustrates a particular embodiment of a dynamic grouping graphical user interface (GUI)

Referring to FIG. 4, a first embodiment of a GUI is shown and generally designated 400. The GUI 400 includes elements (e.g., icons, links, buttons, etc.) 410, 420, and 430 to select managed computer options, managed mobile device options, and managed user options, respectively. In the illustrated example, the element 420 for mobile devices is selected. The GUI 400 also includes elements 440 and 450 that are selectable to display a list of "smart" (e.g., dynamic) mobile device groups and a list of static mobile device groups, respectively. In the illustrated example, the element 440 for smart mobile device groups is selected.

As shown in FIG. 4, the GUI 400 may include a count 402 of a number of active groups. In the illustrated example, three dynamic groups are active: "All Managed Tablets," "All Managed Phones," and "All Managed Music Players." A user may select (e.g., click on, tap on, etc.) a link for an active managed group or a button 460 to define a new dynamic mobile device group. Selecting an active managed group may enable the user to modify grouping criteria and/or other settings associated with the selected group. Selecting the "new" button 460 may enable the user to define grouping criteria for a newly added dynamic group.

Figure 5:
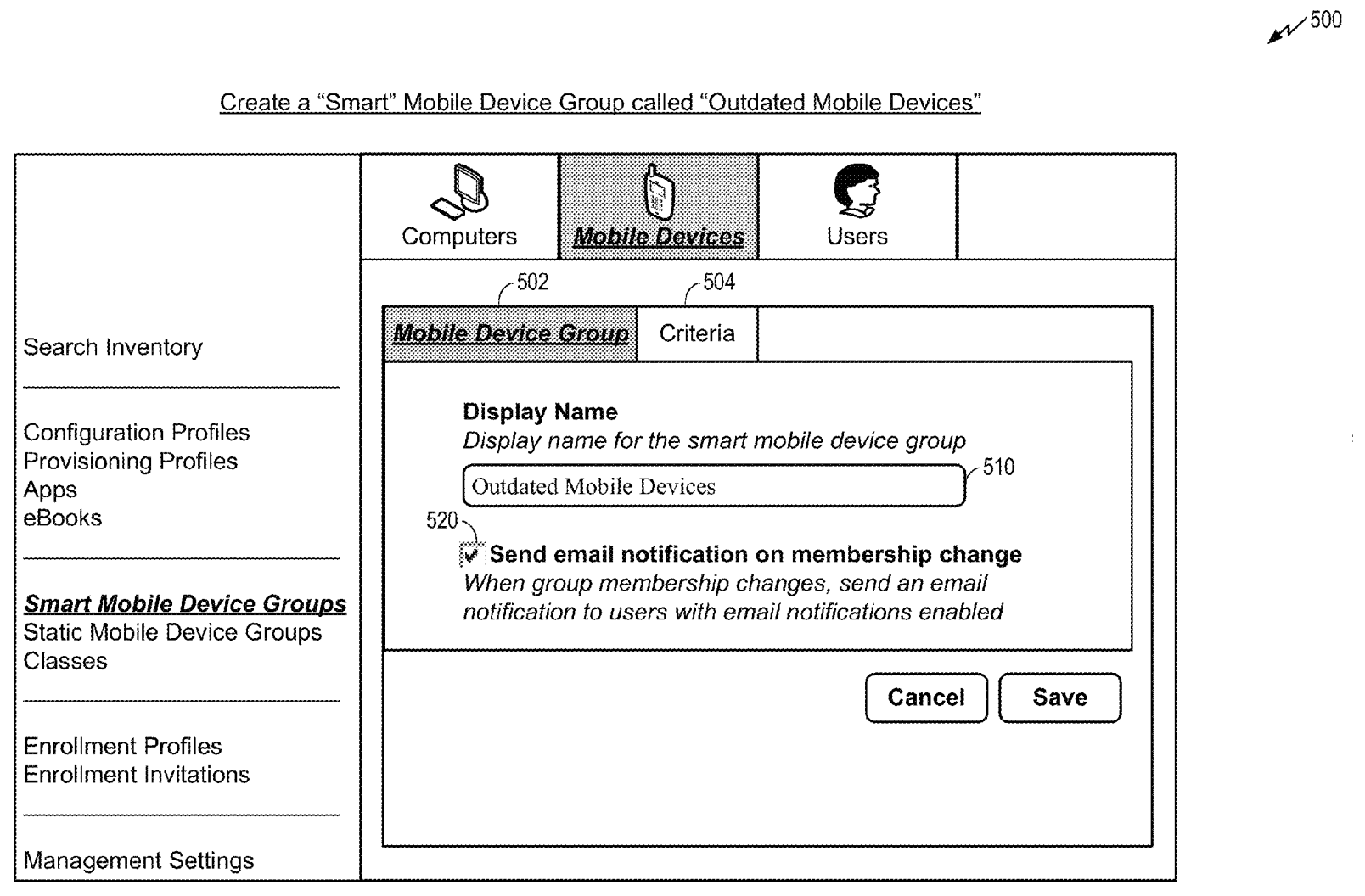

For example, FIG. 5 illustrates a particular embodiment of a GUI 500 corresponding to selection of the "new" button 460 of FIG. 4. The GUI 500 includes a "Mobile Device Group" tab 502 and a "Criteria" tab 504. In the example of FIG. 5, the "Mobile Device Group" tab is selected. The user is creating a new dynamic group for mobile devices, and, as shown at 510, has entered the name "Outdated Mobile Devices" for the group. The user has also selected an option 520 to cause a MDM server (e.g., the MDM server 120 of FIG. 1) to initiate sending an e-mail notification to the user (e.g., to a device associated with the user) when membership of the "Outdated Mobile Devices" group changes. To illustrate, the e-mail notification may correspond to the e-mail message 171 of FIG. 1.

Continuing to FIG. 6, a particular embodiment of a GUI corresponding to selection of the "Criteria" tab 504 of FIG. 5 is shown and is generally designated 600. The GUI 600 may include various elements. In the example of FIG. 6, a button 602 may be used to add another criterion to the grouping criteria. An element 604 is used to include an open parenthesis operator in the grouping criteria. At 606, an inventory data attribute "Model" (e.g., mobile device model) is selected for inclusion in the criteria. As shown at 608 and 610, the sub-criteria involving the "Model" attribute includes an IS operator and the value "2014 Phone." Thus, the "Model" sub-criteria may be satisfied by managed mobile devices having a value of "2014 Phone" for the "Model" inventory attribute. At 612, an AND operator is selected to combine the "Model is 2014 Phone" sub-criteria with a "Display Name is Test Phone" sub-criteria. A close parenthesis operator is selected, at 614, and an OR operator is selected, at 616, to combine the sub-criteria within the parentheses to a sub-criteria "Model is 2013 Phone." Thus, an overall grouping criteria defined in the GUI of FIG. 6 is: (Model is 2014 Phone and Display Name is Test Phone) or Model is 2013 Phone.

Accordingly, mobile devices that are members of the "Outdated Mobile Devices" group will be 2014 model "test" (e.g., beta) phones or 2013 model phones. The user may select a button 618 to save the grouping criteria and finish defining the "Outdated Mobile Devices" group. When the "Outdated Mobile Devices" group is saved, the count 402 of active groups may increase from 3 to 4, and a link for "Outdated Mobile Devices" may be displayed along with the previously displayed links for "All Managed Tablets," "All Managed Phones," and "All Managed Music Players."

Figure 7:
FIG. 7 illustrates another particular embodiment of a dynamic grouping GUI.
Figure 8:
FIG. 8 illustrates another particular embodiment of a dynamic grouping GUI.

Referring to FIG. 7, a particular embodiment of a GUI displayed responsive to selection of a previously created dynamic group is shown and generally designated 700. In particular, the GUI 700 corresponds to a user selecting the link for the previously created "Outdated Mobile Devices" group. The GUI 700 includes a "Done" button 702 to save changes to the group, a "History" button 704 to view history information associated with the group (e.g., how the grouping criteria of the group has evolved over time) and a "View" button 706 to view members of the group. After selecting the view button 706, a user may select an action to be performed with respect to members of the group, as further described with reference to FIG. 11.

The GUI 700 also includes a "Clone" button 708 to create a copy of the group. For example, as shown in the GUI 800 of FIG. 8, selection of the clone button 708 may result in creation of an "Outdated Mobile Devices copy" group. It is noted that the grouping criteria of the "Outdated Mobile Devices copy" group is identical to the grouping criteria for the "Outdated Mobile Devices" group shown in FIG. 6. Cloning a group, such as for testing purposes, may be faster and more convenient than having to manually define a new group with identical grouping criteria as an existing group.

The GUI 700 further includes a "Delete" button 710 to delete the group and the associated grouping criteria and membership data. If a deleted group is used in a recursive group definition for another group, the other group may also be deleted. Alternatively, the user may be prompted regarding whether the other group should be deleted or whether the grouping criteria for the other group should be modified. The GUI 700 includes an "Edit" button 712 to edit the group (e.g., edit the name, e-mail notification status, and/or grouping criteria of the group).

As described with reference to FIG. 1, the present disclosure enables users to recursively define dynamic groups based on membership in other dynamic groups. FIG. 9 illustrates a particular embodiment of a GUI used to define recursive grouping criteria and is generally designated 900. In the example of FIG. 9, grouping criteria for an "Outdated Mobile Device with Low Battery" dynamic group is defined. A mobile device is a member of the dynamic group if the mobile device is a member of the "Outdated Mobile Devices" group described with reference to FIG. 6 and if the mobile device has a battery level of less than 10%. As shown at 902, a "pseudo" inventory attribute called "Mobile Device Group" may be used to recursively define grouping criteria, where the value of the "Mobile Device Group" attribute is the name of another (e.g., previously defined) dynamic group. Corresponding "pseudo" inventory attributes for managed computers and managed users may be called "Computer Group" and "User Group," respectively.

FIG. 9 thus illustrates an example of defining grouping criteria of a first dynamic group (e.g., the "Outdated Mobile Device with Low Battery" group) based on grouping criteria of a second dynamic group (e.g., the "Outdated Mobile Devices" group) and at least one logical operator (e.g., an AND operator). When membership of the second dynamic group changes, a MDM server (e.g., the MDM server 120 of FIG. 1) may automatically re-evaluate and update membership of the first dynamic group. The techniques of the present disclosure may thus enable definition of a dynamic group without re-entering grouping criteria from previously defined dynamic groups.

Figure 10:
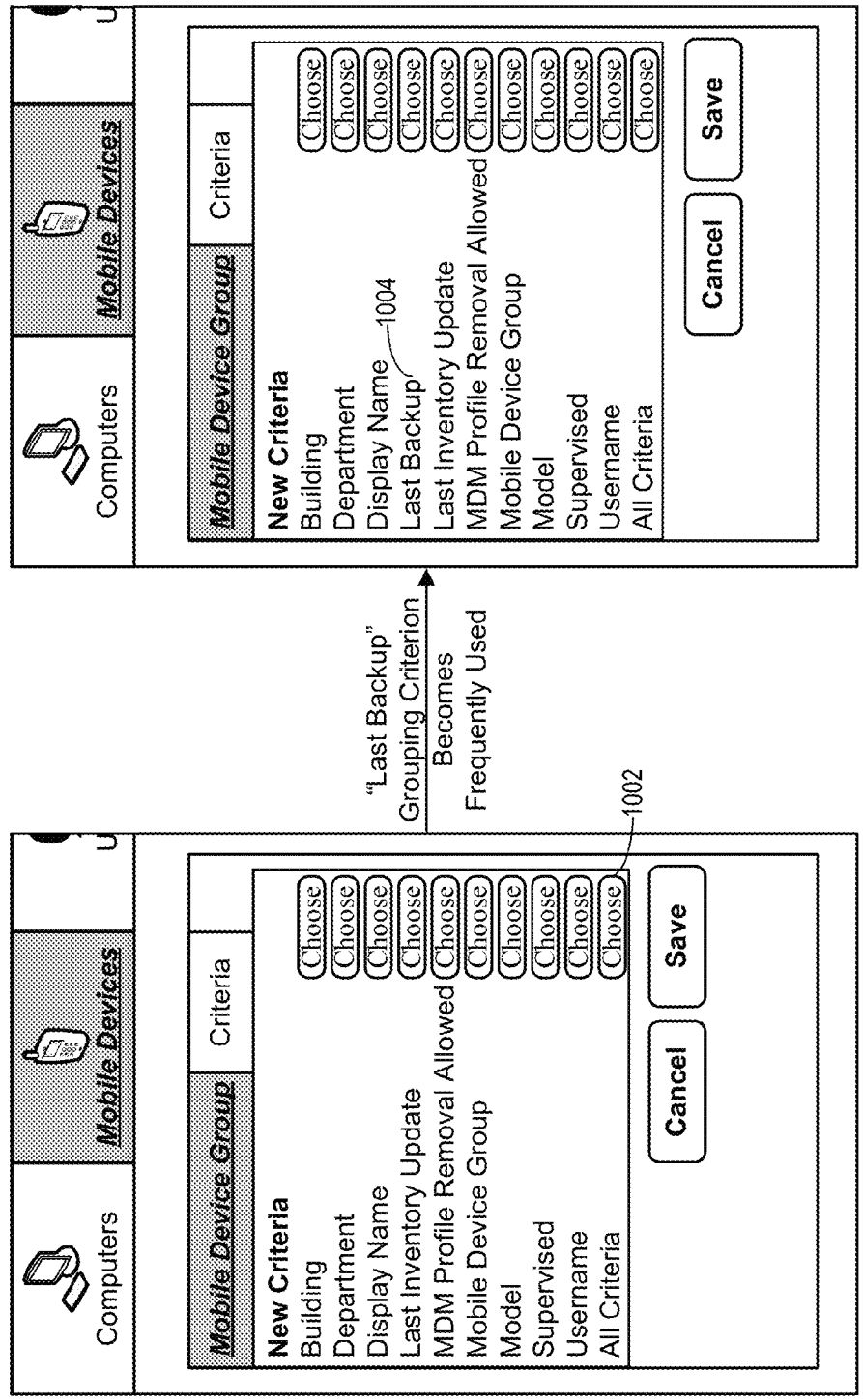
FIG. 10 illustrates another particular embodiment of a dynamic grouping GUI.

In a particular embodiment, a GUI generated in accordance with the described techniques may facilitate entry of grouping criteria by maintaining and displaying a list of frequently used grouping criteria (e.g., inventory data attributes). Referring to FIG. 10, a particular embodiment of maintaining such a "shortlist" is shown and generally designated 1000. When an inventory attribute is added to a grouping criteria (e.g., by selecting the button 602 of FIG. 6), the shortlist of frequently used inventory attributes may be shown instead of a list of all available inventory attributes. In the example on the left of FIG. 10, the shortlist includes: building, department, display name, last inventory update, MDM profile removal allowed, mobile device group, model, supervised, and username. An "All Criteria" option may also be shown, at 1002. Selection of the "All Criteria" option 1002 may display a complete list of all of the available inventory attributes that can be used to define grouping criteria. The shortlist and the complete list may differ based on whether grouping criteria is being defined for managed mobile devices, managed computers, or managed users.

The shortlist of frequently used attributes may be updated as users define dynamic groups. For example, as shown at 1004, after "Last Backup" is selected one or more times during definition of grouping criteria, the "Last Backup" attribute may be added to the shortlist. In a particular embodiment, the shortlist may have a fixed size, and an overflow condition may occur when adding an attribute to the list. In response to the overflow condition, when the attribute is added to the fixed size shortlist another (e.g., least recently used) attribute may be removed from the shortlist.

Figure 11:
FIG. 11 illustrates another particular embodiment of a dynamic grouping GUI.

The GUI(s) generated in accordance with the present disclosure may also be used to indicate an action to be performed with respect to members of a dynamic group. Examples of MDM actions may include, but are not limited to, installing an application at a managed device, adjusting a configuration setting at a managed device, providing content to a managed device, sending a message to a managed device, setting or clearing a passcode, editing one or more inventory data attributes, sending a communication/message (e.g., an e-mail or a short message service (SMS) message), deleting data, sending remote commands, etc. Referring to FIG. 11, a particular embodiment of a GUI that can be used to select an action to be performed with respect to members of a dynamic group is shown and generally designated 1100. In an illustrative embodiment, the GUI 1100 may be after selection of the view button 706 of FIG. 7.

To illustrate, when the view button 706 is selected, a GUI may be displayed that includes a list of managed entities (e.g., computers, mobile devices, and/or users) that are members of a particular dynamic group. The list of managed entities may be based on the group membership data 128 of FIG. 1. In a particular embodiment, membership of the dynamic group may be re-evaluated (e.g., updated) when the user clicks the view button 706 of FIG. 7.

A user may select an element (e.g., button) on the GUI including the list of managed entities to cause the GUI 1100 to be displayed. The GUI 1100 may include a list of "mass actions" that can be performed with respect to each device that is a member of the dynamic group. In the example of FIG. 11, the list of actions includes editing a building or department of one or more managed entities of the group, editing a site of one or more managed entities of the group, sending a notification to one or more managed entities that have a particular application, content, or feature (e.g., self service mobile in FIG. 11) installed/activated, deleting one or more managed entities (e.g., from the group, the inventor database altogether, etc.), and sending remote command(s) to one or more managed entities. In alternative embodiments, different "mass actions" may be available. When an action is selected, the action may automatically be performed with respect to each managed entity of the group, or the user may be provided an option to select particular managed entities within the group as targets of the action.

Figure 12:
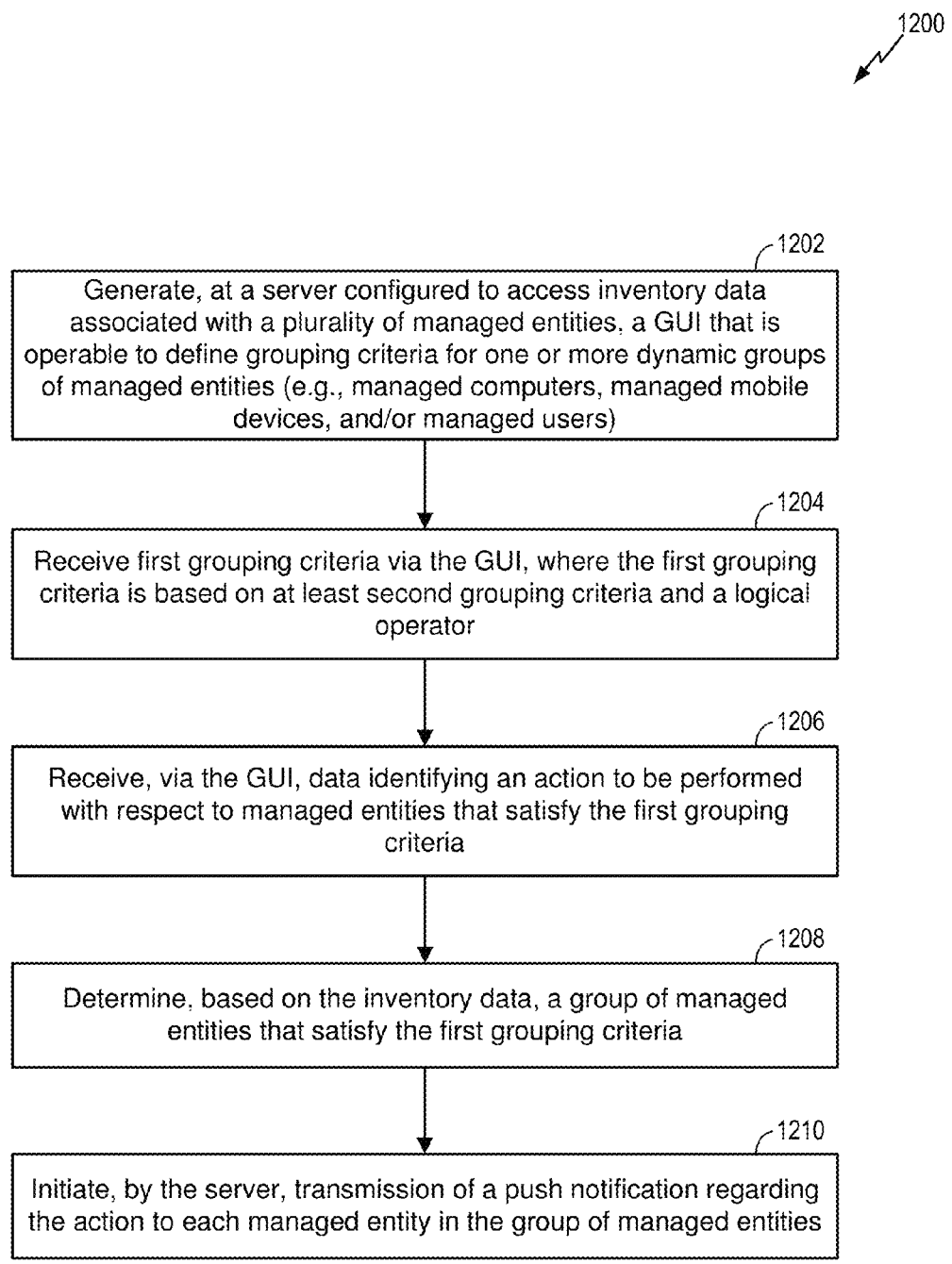
FIG. 12 is a flowchart to illustrate a particular embodiment of a method of operation at a mobile device management (MDM) server.

Referring to FIG. 12, a particular embodiment of operation at a MDM server is shown and generally designated 1200. In an illustrative embodiment, the method 1200 may be performed at the MDM server 120 of FIG. 1.

The method 1200 may include generating, at a server configured to access inventory data associated with a plurality of managed entities, a GUI that is operable to define grouping criteria for one or more dynamic groups of managed entities (e.g., managed computers, managed mobile devices, and/or managed users), at 1202. For example, to generate a dynamic grouping GUI, such as one of the GUIs described with reference to FIGS. 4-11, a MDM server may access inventory and/or group membership data and include in the GUI one or more elements (e.g., links, buttons, etc.) that are based on the inventory and/or group membership data. The MDM server may also enable and/or disable certain GUI elements based on the inventory and/or group membership data. For example, if no managed computers are registered with the MDM server, GUI elements relating to managed computers may be disabled (e.g., "grayed out" and/or unselectable by a user).

The method 1200 may also include receiving first grouping criteria via the GUI, at 1204, where the first grouping criteria is based on at least second grouping criteria and a logical operator. For example, the MDM server 120 may receive, via the GUI 900 of FIG. 9, the grouping criteria for the "Outdated Mobile Device with Low Battery" dynamic group, which is based on the grouping criteria for the "Outdated Mobile Devices" dynamic group and an AND operator. In a particular embodiment, the first grouping criteria may be received based on user input. For example, a MDM server may receive data via a wired or wireless network from a computing device that displays the GUI and receives the user input. The data may include a value typed by a user in a text field, an indication of a button selected by a user, etc. The MDM server may extract such data from received packets/messages and determine the first grouping criteria based on the extracted data.

The method 1200 may further include receiving data via the GUI that identifies an action to be performed with respect to managed entities that satisfy the grouping criteria, at 1206, and determining, based on the inventory data, a group of managed entities that satisfy the first grouping criteria, at 1208. The managed entities may include managed mobile devices, managed computers, managed users, or any combination thereof. In a particular embodiment, the data identifying the action may be received based on user input. For example, a MDM server may receive data via a wired or wireless network from a computing device that displays the GUI and receives the user input, where the data identifies an action selected by a user (e.g. from the GUI 1100 of FIG. 11). The MDM server may extract such data from received packets/messages and determine the selected action based on the extracted data. The MDM server may determine the group of managed entities that satisfy the first grouping criteria by filtering an inventory database using the first grouping criteria as filter parameters. Alternatively, or in addition, a list of members may that satisfy the first grouping criteria may be available in the form of group membership data, where the group membership data is updated in response to receiving updates from individual managed entities.

For example, as illustrated in FIG. 11, the MDM server may receive a selection of the "Send Remote Commands" action of FIG. 11 that is to be performed with respect to mobile devices in the "Outdated Mobile Devices with Low Battery" group.

The method 1200 may include initiating by the server a transmission of a push notification regarding the action that is sent to each managed entity in the group of managed entities, at 1210. For example, to initiate the transmission of the push notification, the MDM server may generate a push notification request that includes a list of group members and/or data regarding the action to be performed, and may send the push notification request to a push notification service (e.g., via a wired or wireless network). When communication to and from the MDM server is encrypted, receiving and transmitting data may also include encryption and/or decryption operations. To illustrate, in FIG. 1, the grouping criteria evaluation module 122 may identify members of the dynamic group and the MDM server 120 may send the notification request 124 to the push notification service 130. In response to the notification request 124, the push notification service 130 may send push notifications (e.g., the push notifications 131 and/or 132) to members of the dynamic group (e.g., the managed computer 140 and/or the managed mobile device 150).

It should be noted that the order of steps or operations described with reference to FIGS. 1-12 is to be considered illustrative and not limiting. In alternate embodiments, the order of steps may be different. Further, one or more steps may be optional and/or replaced by other steps. For example, in particular embodiments the steps 1202 and 1204 may be optional (e.g., a dynamic group may previously have been defined and the method 1200 may begin at step 1206 when a user selects an action to be performed with respect to members of the dynamic group). In addition, one or more steps may be consolidated. In accordance with various embodiments of the present disclosure, one or more methods, functions, and modules described herein may be implemented by software programs executable by a computer system. Further, implementations of one or more embodiments in accordance with the present disclosure can include distributed processing, component/object distributed processing, and/or parallel processing.

Particular embodiments can be implemented using a computer system executing a set of instructions that cause the computer system to perform any one or more of the methods or computer-based functions disclosed herein. A computer system may include a laptop computer, a desktop computer, a server computer, a mobile phone, a tablet computer, a media player, one or more other computing devices, or any combination thereof. The computer system may be connected, e.g., using a network, to other computer systems or peripheral devices. For example, the computer system or components thereof can include or be included within any one or more of the MDM server 120 of FIG. 1, a computing device or server corresponding to the push notification service 130 of FIG. 1, the managed computer 140 of FIG. 1, the managed mobile device 150 of FIG. 1, the e-mail server 170 of FIG. 1, an output device that displays a GUI generated by an MDM server, an input device that receives user input responsive to the GUI, and/or a computing device that includes the output device and the input device.

In a networked deployment, the computer system may operate in the capacity of a server or as a client user computer in a server-client user network environment. The term "system" can include any collection of systems or sub-systems that individually or jointly execute a set, or multiple sets, of instructions to perform one or more computer functions.

In a particular embodiment, the instructions can be embodied in a computer-readable or a processor-readable device. The terms "computer-readable device" and "processor-readable device" include a single storage device or multiple storage devices, such as a centralized or distributed memory, and/or associated caches and servers that store one or more sets of instructions. The terms "computer-readable device" and "processor-readable device" also include any device that is capable of storing a set of instructions for execution by a processor or that cause a computer system to perform any one or more of the methods or operations disclosed herein. For example, a computer-readable or processor-readable device or storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), a solid-state memory, or any other form of storage device. A computer-readable or processor-readable device is not a signal.

In a particular embodiment, a method includes generating, at a server configured to access inventory data associated with one or more managed devices, a GUI that is operable to define grouping criteria for one or more dynamic groups of managed devices. The method also includes receiving, at the server via the GUI, first grouping criteria and data identifying an action to be performed with respect to managed devices that satisfy the first grouping criteria. The first grouping criteria is based on at least second grouping criteria and a logical operator. The method further includes determining, at the server based on the inventory data, a group of managed devices that satisfy the first grouping criteria. The method includes initiating, by the server, transmission of a push notification regarding the action to each managed device in the group of managed devices.

In another particular embodiment, an apparatus includes a processor and a memory storing instructions that, when executed by the processor, cause the processor to perform operations including generating a GUI that is operable to define grouping criteria for one or more dynamic groups of managed devices. The operations also include receiving first grouping criteria via the GUI, where the first grouping criteria is based on at least second grouping criteria and a logical operator. The operations further include receiving, via the GUI, data identifying an action to be performed with respect to managed devices that satisfy the first grouping criteria. The operations further include determining, based on inventory data, a group of managed devices that satisfy the first grouping criteria, and initiating transmission of a push notification regarding the action to each managed device in the group of managed devices.

In another particular embodiment, a computer-readable storage device stores instructions that, when executed by a processor, cause the processor to perform operations including generating, at a server configured to access inventory data associated with one or more managed devices and one or more managed users, a GUI that is operable to define grouping criteria for one or more groups of managed devices, managed users, or both. The operations also include receiving, at the server, first grouping criteria via the GUI and receiving, at the server via the GUI, data identifying an action to be performed with respect to managed devices that satisfy the first grouping criteria. The first grouping criteria is based on at least second grouping criteria and a logical operator. The operations further include determining, at the server based on the inventory data, a group of managed devices, a group of managed users, or both that satisfy the first grouping criteria. The operations include initiating, by the server, transmission of a push notification regarding the action to each managed device in the group of managed devices, to at least one device associated with each user in the group of managed users, or both.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   generating, at a server, a graphical user interface (GUI) to define grouping criteria for one or more dynamic groups of managed devices;
   receiving, at the server via the GUI, first grouping criteria and a first group identifier, wherein the first grouping criteria is used by the server to determine a first set of managed devices to include in a first dynamic group having the first group identifier;
   after receiving the first grouping criteria at the server, receiving second grouping criteria and a second group identifier at the server via the GUI, wherein the second grouping criteria is used by the server to determine a second set of managed devices to include in a second dynamic group having the second group identifier, wherein the second grouping criteria includes:
      a first criterion including the first group identifier; and
      a second criterion indicating that inclusion of a particular managed device in the second dynamic group is conditioned on the particular managed device being included in the first dynamic group and satisfying the second criterion;
   receiving, at the server via the GUI, a selection of an action to be queued with respect to managed devices of the second dynamic group;
   in response to receiving the selection:
      determining the second set of managed devices based on the second grouping criteria;
      initiating, by the server, transmission of a push notification regarding the action to each managed device in the second set of managed devices, wherein the push notification is configured to initiate a check-in event that causes each managed device in the second set of managed devices to send a corresponding check-in request to the server; and
      in response to receiving a particular check-in request from the particular managed device of the second dynamic group, sending a command to the particular managed device to perform the action; and
   in response to detecting a change in the first set, automatically updating the second set of managed devices based on the second grouping criteria.

2. The method of claim 1, wherein the first set includes a managed computer, a managed mobile device, or a combination thereof.

3. The method of claim 1, wherein the second grouping criteria further includes at least one criterion that is distinct from the first group identifier.

4. The method of claim 1, wherein the GUI includes a count of active groups and includes an option to clone grouping criteria, wherein selection of the option with respect to the first grouping criteria automatically generates third grouping criteria that is identical to the first grouping criteria.

5. The method of claim 1, wherein updating the second set includes adding or removing a managed device from the second set of managed devices to generate an updated second set of managed devices.

6. The method of claim 5, further comprising initiating transmission of a second push notification associated with the second dynamic group to each managed device in the updated second set.

7. The method of claim 1, wherein the action comprises installing an application at each of the managed devices of the second dynamic group, adjusting a configuration setting at each of the managed devices of the second dynamic group, providing content to each of the managed devices of the second dynamic group, sending a message to each of the managed devices of the second dynamic group, or any combination thereof.

8. The method of claim 1, further comprising storing, at the server, data identifying the managed devices included in the second dynamic group.

9. The method of claim 8, further comprising:
receiving updated inventory information from the particular managed device;
updating inventory data associated with the particular managed device based on the updated inventory information; and
when the updated inventory information results in addition of the particular managed device to the second dynamic group or removal of the particular managed device from the second dynamic group, updating the data.

10. The method of claim 1, wherein the second grouping criteria includes at least one logical operator comprising an open parenthesis operator, a close parenthesis operator, or a combination thereof.

11. The method of claim 1, wherein the second grouping criteria includes at least one logical operator comprising a HAS operator, a DOES NOT HAVE operator, a MEMBER OF operator, a NOT MEMBER OF operator, or any combination thereof.

12. The method of claim 1, further comprising:
receiving, at the server via the GUI, a delete command identifying the first dynamic group; and
in response to the delete command and based on the second grouping criteria including the first group identifier, displaying a prompt via the GUI, wherein the prompt requests user input regarding deletion of the second dynamic group or modification of the second grouping criteria.

13. The method of claim 1, wherein the second criterion includes a threshold battery charge level.

14. The method of claim 1, wherein the second criterion indicates that membership in the second set is conditioned on a location of a managed device.

15. An apparatus comprising:
a processor; and
a memory configured to store instructions that, when executed by the processor, cause the processor to perform operations comprising:
generating, at a server, a graphical user interface (GUI) to define grouping criteria for one or more dynamic groups of managed devices;
identifying first grouping criteria and a first group identifier received via the GUI, wherein the first grouping criteria is used by the processor to determine a first set of managed devices to include in a first dynamic group having the first group identifier;
after receiving the first grouping criteria, receiving second grouping criteria and a second group identifier via the GUI, wherein the second grouping criteria is used by the processor to determine a second set of managed devices to include in a second dynamic group having the second group identifier, and wherein the second grouping criteria includes:
a first criterion including the first group identifier; and
a second criterion indicating that inclusion of a particular managed device in the second dynamic group is conditioned on the particular managed device being included in the first dynamic group and satisfying the second criterion;
identifying a selection, received via the GUI, of an action to be queued with respect to managed devices of the second dynamic group;
in response to receiving the selection:
determining the second set of managed devices based on the second grouping criteria;
initiating transmission of a push notification regarding the action to each managed device in the second set of managed devices wherein the lush notification is configured to initiate a check-in event that causes each managed device in the second set of managed devices to send a corresponding check-in request to the server; and
in response to receiving a particular check-in request from the particular managed device of the second dynamic group, initiating transmission of a command to the particular managed device to perform the action; and
in response to detecting a change in the first set, automatically updating the second set of managed devices based on the second grouping criteria.

16. The apparatus of claim 15, wherein the memory is further configured to store inventory data.

17. A computer-readable storage device storing instructions that, when executed by a processor, cause the processor to perform operations comprising:
generating, at a server configured to access inventory data associated with one or more managed devices, a graphical user interface (GUI) to define grouping criteria for one or more dynamic groups of managed devices;
identifying, at the server, first grouping criteria and a first group identifier received via the GUI, wherein the first grouping criteria is used by the server to determine a first set of managed devices to include in a first dynamic group having the first group identifier;
after receiving the first grouping criteria at the server, receiving second grouping criteria and a second group identifier at the server via the GUI, wherein the second grouping criteria is used by the server to determine a second set of managed devices to include in a second dynamic group having the second group identifier, wherein the second grouping criteria includes:
a first criterion including the first group identifier; and
a second criterion indicating that that inclusion of a particular managed device in the second dynamic group is conditioned on the particular managed device being included in the first dynamic group and satisfying the second criterion;
identifying a selection, received via the GUI, of an action to be queued with respect to managed devices or users of the second dynamic group;
in response to receiving the selection:
determining the second set of managed devices based on the second grouping criteria;
initiating, by the server, transmission of a push notification regarding the action to each managed device in the second set of managed devices, wherein the push notification is configured to initiate a check-in event that causes each managed device in the second set of managed devices to send a corresponding check-in request to the server; and
in response to receiving a particular check-in request from the particular managed device of the second dynamic group, initiating transmission of a command to the articular managed device to perform the action; and in response to detecting a change in the first set, automatically updating the second set of managed devices based on the second grouping criteria.

18. The computer-readable storage device of claim 17, wherein the GUI identifies a subset of frequently used grouping criteria.

19. The computer-readable storage device of claim 17, wherein the GUI includes:

an option to clone the first dynamic group by copying the first grouping criteria to a third dynamic group without reentry of the first grouping criteria for the third dynamic group; and a count of active groups.

* * * * *

UNITED STATES PATENT AND TRADEMARK OFFICE
CERTIFICATE OF CORRECTION

| | | |
|---|---|---|
| PATENT NO. | : 9,647,897 B2 | Page 1 of 1 |
| APPLICATION NO. | : 14/464572 | |
| DATED | : May 9, 2017 | |
| INVENTOR(S) | : Richard Zachary Halmstad et al. | |

It is certified that error appears in the above-identified patent and that said Letters Patent is hereby corrected as shown below:

In the Claims

Column 18, Claim 15, Lines 11-12, "wherein the lush notification" should read --wherein the push notification--.

Column 19, Claim 17, Line 2, "to the articular managed device" should read --to the particular managed device--.

Signed and Sealed this
First Day of August, 2017

Joseph Matal
*Performing the Functions and Duties of the*
*Under Secretary of Commerce for Intellectual Property and*
*Director of the United States Patent and Trademark Office*